Aug. 21, 1923.
L. E. W. PIODA
1,465,863
PROCESS OF AND APPARATUS FOR MANUFACTURING CEMENT
Filed May 4, 1923
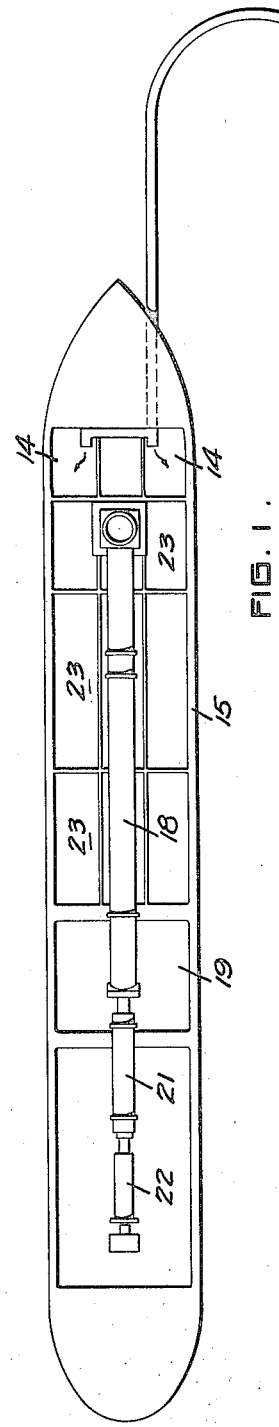
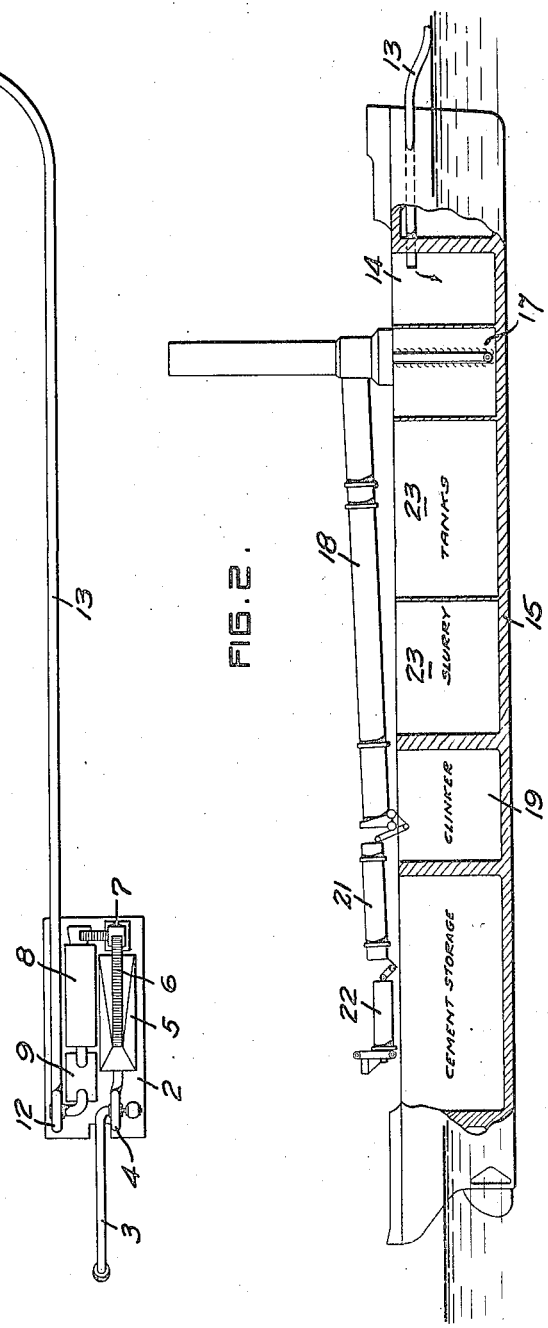
INVENTOR
L.E.W. Pioda
BY White Prost Evans
his ATTORNEYS.
WITNESS:
H. Sherburne Patented Aug. 21, 1923.

1,465,863

UNITED STATES PATENT OFFICE.

LOUIS E. W. PIODA, OF SAN FRANCISCO, CALIFORNIA.

PROCESS OF AND APPARATUS FOR MANUFACTURING CEMENT.

Application filed May 4, 1923. Serial No. 636,724.

*To all whom it may concern:*

Be it known that I, LOUIS E. W. PIODA, a citizen of the United States, and a resident of the city and county of San Francisco, State of California, have invented a certain new and useful Process of and Apparatus for Manufacturing Cement, of which the following is a specification.

The invention relates to a process of and an apparatus for manufacturing Portland cement from submerged deposits of raw material.

An object of the invention is to provide a commercially practicable process of making cement from submerged deposits of cement making materials such as mixtures or superposed layers of shells and clay.

Another object of the invention is to provide a cement manufacturing plant of low initial cost for converting these raw materials into cement at a low cost.

Many deposits of argillaceous and calcareous materials, which are the raw materials of which Portland cement is made, occur in or adjacent to bodies of water. These deposits frequently occur mixed in the form of marl and frequently occur in superposed layers, of shells and clay. In ages past, the shellfish, whose shells now form these beds, lived in bays adjacent the mouths of rivers where the water was partly salt and partly fresh. The rivers brought down very finely divided silt or clay and this silt deposited in the shell beds, forming mixtures or layers of shells and very finely divided clay, thus forming natural beds of raw materials for the manufacture of cement. These shells are almost pure carbonate of lime, being free from objectionable minerals, such as magnesia for instance, commonly found in conjunction with lime-rock, and the clay is very finely divided, both of which features are of great advantage in the manufacture of cement. The clay ingredient requires no grinding, thus assisting in reducing the cost of the manufacture of the cement. No system has heretofore been devised or suggested for using these beds of shells and clay for the manufacture of cement.

These raw materials, that is, the shells and clay, enter into the manufacture of cement in certain definite quantities, usually two-thirds shells and one-third clay. In the submerged deposits they invariably do not occur in this proportion and invariably there is an excess of clay so that some of the finely divided clay must be removed from the dredged mixture before the mixture is burned to make cement. I have devised an apparatus for removing the excess of finely divided clay and surplus water from the mixture and this apparatus is fully disclosed in my copending application for United States Letters Patent, Serial Number 603,203, filed November 25, 1922.

As described in my copending application just mentioned the ratio of the clay and shells is controlled by controlling the amount of clay carried off by the water discharged from the receptacle. The amount of solids which a flowing stream can carry off varies with the velocity and volume of the flow and consequently I control the velocity and volume of the water and so regulate the amount of clay eliminated and in this manner restrict the clay component of my material to that proper for the making of cement. The clay being very finely divided is readily taken up by the flowing water while the shells being coarse are not in any way affected so by having a conveyor for the bottom of the tank discharging at one end of the tank and by allowing the water, which carries an amount of clay in suspension depending on the velocity and volume of the water, to spill over wiers at the sides, the proportion of clay and shells carried out by the conveyor can be kept at the desired ratio by altering the position of the wiers and consequently the velocity and volume of the water. All the parts here mentioned are of old and well known type and no claim is made in the present application for the subject matter of the proportioning apparatus per se.

Due to their form shells tend to lodge wherever deposited and their transportation is difficult and expensive. To save transportation costs and to greatly decrease the cost of the cement making plant I prefer to grind the shells in the mixture at a point adjacent to the dredge and to burn the slurry that is formed, to a clinker at the same or at an adjacent point. The cement is thus manufactured in situ, thus saving all transportation costs of raw material.

Cement plants require very heavy foundations to support the weight of and withstand the vibration of the mills and rotary kilns and the character of the ground adjacent the deposits is such that foundations cannot be readily built. In accordance with my invention I propose to arrange the mill and kiln on a hull or float so that the weight and vibration are transferred to the water in which the hull is floating, thereby dispensing with the very heavy foundations which are otherwise necessary. The manufacturing plant, as a whole may be fabricated and erected at an industrial center and transported to the place where it is to operate. It can be transported as a complete unit, thus further reducing the cost of the plant.

The invention possesses other advantageous features, some of which with the foregoing, will be set forth at length in the following description, where I shall outline in full, that form of the apparatus of my invention, which I have selected for illustration in the drawings accompanying and forming part of the present specification. In said drawings I have shown one embodiment of my invention, but it is to be understood that I do not limit myself to such form, since the invention, as set forth in the claims, may be embodied in a plurality of forms.

Referring to said drawings:

Fig. 1 is a plan view, partly diagrammatic, of the cement making plant of my invention, showing the dredging and grinding means arranged on a hull or barge which is movable with respect to the hull on which the kiln is mounted.

Fig. 2 is a side elevation, partly diagrammatic and partly in section of the hull on which the kiln is mounted.

The apparatus of my invention comprises means for excavating and elevating the submerged deposit of shells and clay, with water, properly proportioning the amount of shells and clay and water in the mass elevated, grinding the shells to convert the mass to a slurry and conveying the slurry to a kiln wherein it is burned to a clinker.

In the drawings I have shown the dredging, proportioning and grinding means arranged on a barge which is movable with respect to the hull and which is connected to the hull by a flexible pipe line, but it is to be undertsood that I do not limit myself to such construction, since all of the elements of the apparatus may be arranged on the hull. I prefer, however, to arrange the dredging, proportioning and grinding means on a barge which may be more readily movable than the hull so that the hull may remain stationary for many years while the barge is moved over the deposit.

The barge 2 is provided with any standard form of suction or other dredge 3 for excavating and elevating the mixture of shells, clay and water to the barge. The elevated mass is discharged by the dredge pump 4 into a proportioning device 5, in which the proportions of the shells, clay and water are altered to produce the proper cement making mixture. The device 5 is fully disclosed and claimed in my copending application hereinbefore mentioned. The material, as dredged, contains usually an excess of water and an excess of clay and this excess is removed in the device 5. The materials in their proper proportion are removed from the proportioning device 5 by the conveyor 6 and discharged into any standard form of crusher such as miner's rolls 7, in which the shells are crushed. The mixture discharging from the crusher 7 is conveyed to the raw mill or ball mill 8, of any standard construction, in which the mixture is reduced to a slurry of finely divided shells and clay. The clay, as dredged, is very finely divided so that in the crusher and the raw mill, all of the effort is devoted to crushing and grinding the shells. From the raw mill 8, the slurry discharges into a tank 9 whence it is forced, by the pump 12, through a flexible conduit 13, extending to the hull 15. The slurry is readily pumped through a flexible conduit, which is very easily handled, so that no difficulties are encountered in conveying the slurry from the barge to the hull. The hull 15 is provided with a plurality of slurry test tanks 14 into which the slurry is discharged from the conduit and from which after being tested, the slurry is delivered to the main storage tanks 23. The tanks are provided with agitators, as is common practice in wet process cement mills, and the slurry is conveyed from the tanks by the elevator 17 and discharged into the rotary kiln 18, which is arranged on the deck of the hull. From the kiln 18 the clinker is passed through the cooler 21 and thence discharged into the clinker storage bin 19 or introduced into the finish mill 22 and the product therefrom is sacked or otherwise packaged and is ready for shipment.

By virtue of this invention I am enabled to produce a cement making plant at a much lower cost than a plant of equivalent capacity built on solid ground and I am able with said plant to manufacture cement from submerged deposits of argillaceous and calcareous material at a cost which is lower than the cost of production of cement in a mill located on land. In the majority of mills the limestone must be transported from one quarry and the clay transported from another quarry and then the two ingredients mixed in their proper proportions. In following out the process of my invention the limestone and clay are converted, in situ, to cement thus greatly reducing the cost of the manufacture of the cement.

All of the equipment used in the plant of my invention is standard with the exception of the proportioning device of my invention, which is fully described in my copending application. The plant may be readily constructed and operated and will render useful the large submerged beds of shell and clay which are now not given any economic consideration.

I claim:

1. The method of manufacturing cement from a submerged deposit of argillaceous and calcareous material, which comprises excavating and elevating a mixture of the material and water, manipulating the mass elevated to eliminate a portion of the water and to properly proportion the amounts of argillaceous and calcareous material therein, grinding the thus proportioned material to produce slurry and conveying the slurry to a kiln.

2. The method of manufacturing cement from a natural deposit of shells of substantially pure calcium carbonate and of finely divided silt or clay which consists in excavating the clay and shells with sufficient water to make a fluid mass, proportioning the relative amounts of water, clay and shells to produce a proper cement mixture, grinding the shells, and in burning the slurry to clinker.

3. The method of manufacturing cement from a submerged deposit of shells and finely divided clay, which comprises excavating and elevating a mixture of the shells, clay and water, removing excess clay and water from the mixture, grinding the shells to convert the mixture to a slurry, conveying the slurry to a kiln and burning the slurry to a clinker.

4. An apparatus for manufacturing cement from a submerged deposit of argillaceous and calcareous material, comprising a floating hull adapted to be held adjacent to the submerged deposit, a cement burning kiln on the hull, a second hull, means on the second hull for excavating and elevating the material of the deposit mixed with the submerging water, means on the second hull for properly proportioning the amounts of argillaceous and calcareous material and water in the elevated mass to produce the proper cement mixture, means on the second hull for grinding the material in water to form slurry and a flexible conduit through which the slurry is pumped, connecting the second hull with the first hull.

5. An apparatus for manufacturing cement from a submerged deposit of clay and shells comprising a cement burning kiln, a hull, means on said hull for excavating and elevating the clay and shells together with a part of the submerging water, means on said hull for properly proportioning the relative amounts of clay, shells, and water to produce the proper cement mixture, means on said hull for grinding the material in water to form a slurry and means for conveying the slurry from said hull to said kiln.

6. The method of manufacturing cement from a submerged deposit of argillaceous and calcareous material in which the dry weight of the argillaceous material is in excess of the proportion necessary to produce cement, which comprises excavating and elevating the material and water and treating the elevated mass in situ to produce cement.

7. The method of manufacturing cement from a submerged deposit of clay and shells in which the clay is in excess of the proportion necessary to produce cement, which comprises excavating and elevating the materials and water, removing a part of the clay, and in treating the elevated mass to produce cement.

In testimony whereof, I have hereunto set my hand.

LOUIS E. W. PIODA.